United States Patent [19]

Kobayashi et al.

[11] Patent Number: 5,353,269
[45] Date of Patent: Oct. 4, 1994

[54] DISK STORAGE APPARATUS

[75] Inventors: Takashi Kobayashi, Kanagawa; Tsurayuki Sugiyama, Tokyo, both of Japan

[73] Assignees: NKK Corporation; Kabushiki Kaisha Nikkyo Seisakusho, Japan

[21] Appl. No.: 920,461
[22] PCT Filed: Dec. 25, 1990
[86] PCT No.: PCT/JP90/01690
   § 371 Date: Aug. 19, 1992
   § 102(e) Date: Aug. 19, 1992

[51] Int. Cl.$^5$ .................................... G11B 17/22
[52] U.S. Cl. ................................ 369/36; 369/34; 369/192; 360/98.04
[58] Field of Search ............. 369/34, 36, 191, 192, 369/193, 195; 360/92, 98.04, 98.06

[56] References Cited

U.S. PATENT DOCUMENTS

| | | | |
|---|---|---|---|
| 4,561,078 | 12/1985 | Nakayama | 369/38 |
| 4,779,151 | 10/1988 | Lind et al. | 360/92 |
| 4,797,865 | 1/1989 | Imai et al. | 369/39 |
| 4,815,055 | 3/1989 | Fago, Jr. | 369/36 |
| 4,817,070 | 3/1989 | Hug et al. | 369/36 |
| 4,817,071 | 3/1989 | Carlson et al. | 369/36 |
| 4,853,916 | 8/1989 | Tomito | 369/36 |
| 4,878,137 | 10/1989 | Yamashita et al. | 360/98.05 |
| 4,989,191 | 1/1991 | Kuo | 369/33 |
| 5,020,043 | 5/1991 | Kohler | 369/36 |
| 5,033,038 | 7/1991 | Kobayashi et al. | 369/36 |
| 5,058,090 | 10/1991 | Ueno et al. | 369/36 |
| 5,128,912 | 7/1992 | Hug et al. | 369/38 |
| 5,220,548 | 6/1993 | Nakatsukasa et al. | 369/36 |
| 5,231,552 | 7/1993 | Schneider et al. | 360/92 |
| 5,255,251 | 10/1993 | Fitzgerald et al. | 369/36 |
| 5,274,516 | 12/1993 | Kakuta et al. | 360/92 |
| 5,278,708 | 1/1994 | Apple et al. | 360/92 |

FOREIGN PATENT DOCUMENTS

| | | |
|---|---|---|
| 59-186168 | 10/1984 | Japan . |
| 60-15854 | 1/1985 | Japan . |
| 60-50660 | 3/1985 | Japan . |
| 60-177465 | 9/1985 | Japan . |
| 60-201566 | 10/1985 | Japan . |
| 60-224144 | 11/1985 | Japan . |
| 60-253058 | 12/1985 | Japan . |
| 60-261066 | 12/1985 | Japan . |
| 63-269373 | 11/1988 | Japan . |
| 0231366 | 2/1990 | Japan . |

*Primary Examiner*—Stuart S. Levy
*Assistant Examiner*—Paul J. Ditmyer
*Attorney, Agent, or Firm*—Thomas H. Whaley

[57] ABSTRACT

A disk exchanger apparatus including a disk gripper and a disk exchange mechanism capable of horizontally holding a disk cartridge and selectively introducing and removing the disk cartridge through access openings at both sides of the gripper from disk storage devices horizontally storing a plurality of disk cartridges on either side of the disk gripper, and a movable storage unit capable of storing a plurality of disk cartridges to be loaded in one of the disk storage devices through an access door whereby the disk cartridges may be transported and stored in a horizontal position and selectively transported between the storage unit and the disk storage devices.

9 Claims, 12 Drawing Sheets

DISK STORAGE APPARATUS

TECHNICAL FIELD

The present invention relates; to a disk storage apparatus which is designed to automatically store disk cartridges each containing for example an optical disk, and more particularly the invention relates to a disk storage apparatus which can also be utilized as an automatic disk exchange apparatus when it incorporates drive units for the recording and reproduction of information from the optical disks.

BACKGROUND ART

As the conventional techniques relating to the present invention, an automatic disk exchange apparatus will now be described by way of example. This type of automatic disk exchange apparatus is designed for use as a peripheral equipment for optical information reproducing apparatus and it is disclosed for example in Laid-Open Patent No. 60-243865.

FIG. 14 is a perspective view showing a conventional automatic disk exchange apparatus. In the Figure, numeral 1 designates disk cartridges each containing an optical disk, 2 disk storage devices each in the form of a bookcase having a plurality of slots for vertically storing the disk cartridges 1,3 drive units for recording onto and reproducing information from the optical disks, 4 a transport device arranged in opposition to the disk inlet/outlet ports of the storage devices 2, 5 a transport frame supported in a cantilevered manner on a rotating part 4a of the transport device 4, the transport frame 5 incorporating transfer means for transferring the disk cartridge 1.

With the automatic disk exchange apparatus constructed as described above, in order to transport selected one of the disk cartridges 1 stored in the storage device 2 to the drive unit 3 for information recording/reproducing purposes, the transport device 4 is driven into operation so that the transport frame 5 as moved in an X direction or the traverse direction, and a Z direction or the vertical direction, thereby stopping it at the position where the selected disk cartridge 1 is stored. In this condition, the given disk cartridge 1 is moved in the Y direction by the transfer means of the transport frame 5 to transfer it from the storage device 2 to the transport frame 5.

Then, after the transport frame 5 has been rotated through 90 degrees by the rotating means 4a of the transport device 4 thereby bringing it into a horizontal position, the transport frame 5 is moved downward, transported to the position of the drive unit 3 and stopped thereat by means of the transport device 4. Thereafter, the disk cartridge 1 in the transpoint frame 5 is inserted through an inlet/outlet port 6 of the drive unit 3 and mounted in position within the drive unit 3. When the disk cartridge 1 is mounted in the drive unit 3, its optical disk is subjected to the recording/reproduction of information by the drive unit 3.

When the recording/reproduction by the drive unit 3 is completed, the disk cartridge 1 is delivered to the transport frame 5 from the drive unit 3. The transport frame 5 is transported in the reverse direction to the previously mentioned operation and the disk cartridge 1 is restored in the initial position in the storage device 2.

Also, when selected one of the disk cartridges 1 stored in the storage device 2 is to be removed to the outside for changing, the disk cartridge 1 to be changed is temporarily stored in a vacant slot 7 provided in the storage device 2 by the transport unit 4. This disk cartridge 1 is removed to the outside through a cartridge inlet/outlet port 8. When a disk cartridge 1 is to be stored in the storage device 2 from the outside, the disk cartridge 1 is inserted through the cartridge inlet/outlet port 8, and the disk cartridge 1 stored in the vacant slot 7 is removed, transported to a given position in the storage device 2 and stored thereat by the transport device 4.

In this way, it is possible to store a plurality of disk cartridge 1 in the storage devices 2 and automatically transport the stored disk cartridges 1 between the storage devices 2 and the drive units 3, thereby affecting the recording and reproduction of information efficiently.

In accordance with the above-described conventional automatic disk exchange apparatus, however, in view of the fact that the disk cartridges 1 are vertically stored in the storage device 2 and the drive unit 3 is arranged horizontally, the transportation between the storage device 2 and the drive unit 3 requires that the transport frame 5 is caused to make not only a three-dimensional motion in the X, Y and Z directions but also a rotary motion for changing the position of the disk cartridge. As a result, there are drawbacks that the transport device 4 is complicated in construction and that troubles tend to occur easily.

Also, since the transport frame 5 is required to make a three-dimensional motion and a rotary motion, as for example, the three-dimensional motion for moving the transport fame 5 requires 3 to 4 seconds and the rotary motion requires about 1 second, thus requiring about 4 to 5 seconds as the total access time. If the disk cartridges 1 are stored at a place more remote from the drive unit 3, this access time is additionally increased correspondingly. Thus, there is also a disadvantage that the time interval between the removal of the disk cartridge 1 from the storage device 2 and the mounting of it in the drive unit 3 is increased.

There is another disadvantage that since the transport frame 5 is supported in a cantilevered manner on the transport device 4, not only the transport frame 5 must be balanced by balancing means such as springs but also a motor producing a large torque is required for rotating the transport frame 5 against the force of the balancing means, thereby further complicating the construction and increasing the failure rate and the production cost.

Further, since the storage device 2 is arranged along the transport path of the transport frame 5 which is supported in a cantilevered manner on the transport device 4, the storage device 2 can be provided only on one side of the transport frame 5 and therefore there are disadvantages that the accommodation efficiency of the disk cartridges 1 is deteriorated and that the apparatus is inevitably increased in size in cases where a large number of disk cartridges 1 are accommodated.

Further, where the disk cartridges 1 are to be changed between the outside and the storage devices 2, the exchange is effected by removing and introducing the disk cartridges 1 through the cartridge inlet/outlet port 8 always one at a time and thus there is the disadvantage that much time is required for storing and returning a plurality of the disk cartridges 1.

DISCLOSURE OF INVENTION

The present invention has been made with a view to overcoming the foregoing deficiencies in the prior art, and it is an object of the invention to provide a disk storage apparatus which is capable of enhancing the disk cartridge accommodating efficiency and effecting the exchange of disk cartridges in a short period of time. The disk storage apparatus of this invention is an improvement over that disclosed in our U.S. Pat. No. 5,033,038, incorporated herein by reference.

The disk storage apparatus according to the present invention is characterized by comprising:

- a disk gripper including a holder for horizontally holding a disk cartridge, a rotational drum attached to each of the ends of the holder and provided with a disk access opening in the central portion thereof, and disk exchange means for introducing and removing a disk cartridge in a horizontal position from the holder through either of the disk access openings,
- a disk transport device including lifting means for vertically moving the disk gripper to stop it at a given position,
- a pair of disk storage devices each arranged on one side of the transport path of the disk gripper so as to horizontally store a plurality of disk cartridges, and
- a moving storage unit in the lower part of at least one of the disk storage devices for storing horizontally a given number of disk cartridges.

Also, in accordance with a preferred aspect of the present invention, the disk exchange means of the disk gripper includes:

- two driving roller pairs including a pair of inner gripper rollers disposed at the ends of one longitudinal side of the holder so as to grip the disk cartridge within the holder and a pair of outer gripper rollers each arranged contiguously to one of the inner gripper rollers so as to grip the disk cartridge within the disk storage device,
- two follower gripper roller pairs including a pair of inner gripper rollers and a pair of outer gripper rollers which are disposed at the ends of the other longitudinal side of the holder and are respectively positioned in opposition to the driving gripper roller pairs,
- gripper roller rotational driving means for rotating the gripper rollers,
- driving roller pair changeover means including a pair of driving cams which are respectively engaged with the driving roller pairs at the ends of the holder and which are connected with a phase shift of 180 degrees, and rotational driving means for rotating the driving cams, and
- follower roller pair changeover means including a pair or cams each mounted on the rotary shaft of one of the driving cams with a phase shift of 180 degrees therebetween, and a pair of links each connected between one of the pair of cams and one of the follower roller pairs Further, the following roller pair changeover means should preferably be constructed to include a pair of main arms arranged along the one longitudinal side of the holder in such a manner that their base ends serve as a common rotary shaft, a pair of auxiliary arms each connected to the forward end of one of the main arms, the driving roller pairs respectively mounted at the ends of the auxiliary arms, the driving cams respectively engaged with the driving roller pairs with a phase shift of 180 degrees therebetween, and the rotational driving means for rotating the driving cams.

Further, it is preferable that the moving storage unit is composed of a storage pack for horizontally storing a given number of disk cartridges regularly, and a loading door provided in the loading portion outer wall of the storage pack and adapted to be pivoted about its lower support portion for opening and closing and that the loading door is attached to the front panel of the apparatus.

This moving storage unit should preferably be provided with locking means for inhibiting the opening of the loading door during the transfer of the disk cartridges and the recording and reproduction of the disks, and a door opening/closing detecting switch for sending a power supply turn-off signal in response to the opening of the loading door and for sending a power supply turn-on signal in response to the closing of the loading door.

Also, it is preferable to provide power supply monitoring means for sending a signal which inhibits mechanical operations when the power supply is not turned off upon the passing of a given time since the opening of the loading door.

It is advantageous to provide a pack detecting switch for detecting whether the storage pack is loaded when the loading door is closed whereby a locking release signal for the locking means is sent out when the storage pack is not loaded.

Also, it is advantageous to provide cartridge locking means for locking the disk cartridges when the storage pack of the moving storage unit is removed from the unit.

Further, with these disk storage devices, in addition to the loading of the moving storage unit in the lower part of the disk storage device, drive units for recording and reproducing information from the disks can be arranged in the lower part of the other disk storage device.

Then, it is advantageous that each of the drums is formed with a gear in its outer peripheral surface and the disk transport device is provided with rotating means which is engaged with the gear to rotate the disk gripper with the center of the disk access opening serving as an axis of rotation.

In accordance with the present invention, bit virtue of the fact that the disk storage device horizontally storing a plurality of disk cartridges is provided on each side of the disk gripper and that the moving storage unit horizontally storing a given number of disk cartridges to be changed in the lower part of one of the disk storage devices, the disk cartridges stored in the moving storage unit can be selectively taken out, held in a horizontal position and transported to the disk storage device by the disk gripper, thereby reducing the disk cartridge transport distance and simplifying the construction of the disk transport device.

Still further, the used-up disk cartridges stored in each disk storage device can be changed with new disk cartridges between the disk storage device and the moving storage unit.

Still further, by virtue of the fact that the moving storage unit includes (he storage pack storing a given number of disk cartridges and the loading door formed in the outer wall of the loading portion of the storage pack, a plurality of the disk cartridges can be simultaneously stored or returned.

By attaching the loading door to the front panel of the apparatus, the storage and return of disk cartridges can be effected simply.

Further, since the moving storage unit is provided with locking means for inhibiting the opening of the loading door during the recording, reproduction and transfer of a disk cartridge, and a door opening/closing detecting switch for sending a power supply turn-off signal in response to the opening of the loading door and a power supply turn-on signal in response to the closing of the loading door, the loading door is prevented from opening to turn off the power supply during the transfer of a disk cartridge or during the operation of the drive unit.

Still further, when the locking means is released and the loading door is opened, the power supply is immediately turned off thereby preventing the operator from receiving an electric shock or becoming caught in the machine when he places his hand in the apparatus and effecting the storage and return of disk cartridges safely.

Still further, by virtue of the fact that a signal for inhibiting the mechanical operations is delayed from the power supply monitoring means when the power supply is not turned off after the lapse of a given time following the opening of the loading door, the safety is ensured doubly during the removal of a disk cartridge.

Still further, by detecting whether the storage pack is being loaded by means of the pack detecting switch, the operation can be prevented when the storage pack is not loaded.

Still further, due to the provision of the cartridge locking means for locking the disk cartridges when the storage pack of the moving storage unit is removed from the loading portion, it is possible to prevent dropping of the disk cartridges stored in the storage pack, and to permit transportation of the disk cartridges without damage or less of the disk cartridges.

Then, where the present apparatus also incorporates the drive units, the automatic selection and reproduction of disk cartridges are made possible and the present apparatus can be used as such as "automatic disk exchange apparatus".

In this case, by rotating the disk gripper about the center of the disk access opening as a horizontal axis of rotation by the rotating means of the disk transport device, the disk cartridge within the disk gripper can be transported in its turned-over condition to the drive unit and either side of the optical disk contained within the disk cartridge can be selected as desired.

Further, by alternately opening and closing the driving roller pairs and the follower roller pairs, which are incorporated in the disk gripper to grip and transfer a disk cartridge, at the respective side ends of the disk gripper by the driving roller pair changeover means and follower roller pair changeover means, it is possible to selectively introduce or remove a disk cartridge from either disk access opening of the disk gripper.

Also, the driving roller pair changeover means can be arranged on each longitudinal side of the holder so that by rotating each pair of main arms having the common rotary shaft, the driving roller pairs on the auxiliary arms connected to the forward ends of the main arms can be alternately opened and closed at the respectively side ends of the disk gripper, thereby selectively introducing or removing a disk cartridge from the disk access openings of the disk gripper in the like manner as mentioned previously.

As described hereinabove, in accordance with the present invention the disk cartridges are changed between the disk storage devices and the moving storage unit or between the disk storage devices and the drive units while always holding the disk cartridges horizontally, with the result that the disk storage devices can be arranged on the sides of the transport path of the disk gripper so that not only a large number of disk cartridges can be stored but also the transport distance of the stored disk cartridges can be decreased, thereby greatly reducing the total access time required for the exchange of the disk cartridges.

Further, since the disk transport device can transport a disk cartridge in response to a one-dimensional linear motion by the lifting means, the disk transport device can be simplified and the rate of occurrence of troubles can be reduced.

Also, since the moving storage unit is provided in the lower part of one of the disk storage devices so that disk cartridges can be introduced into and removed from the storage apparatus through the moving storage unit, the disk cartridge introducing or returning operation can be easily effected in a short period of time.

BEST MODE FOR CARRYING OUT THE INVENTION

Figure 1:
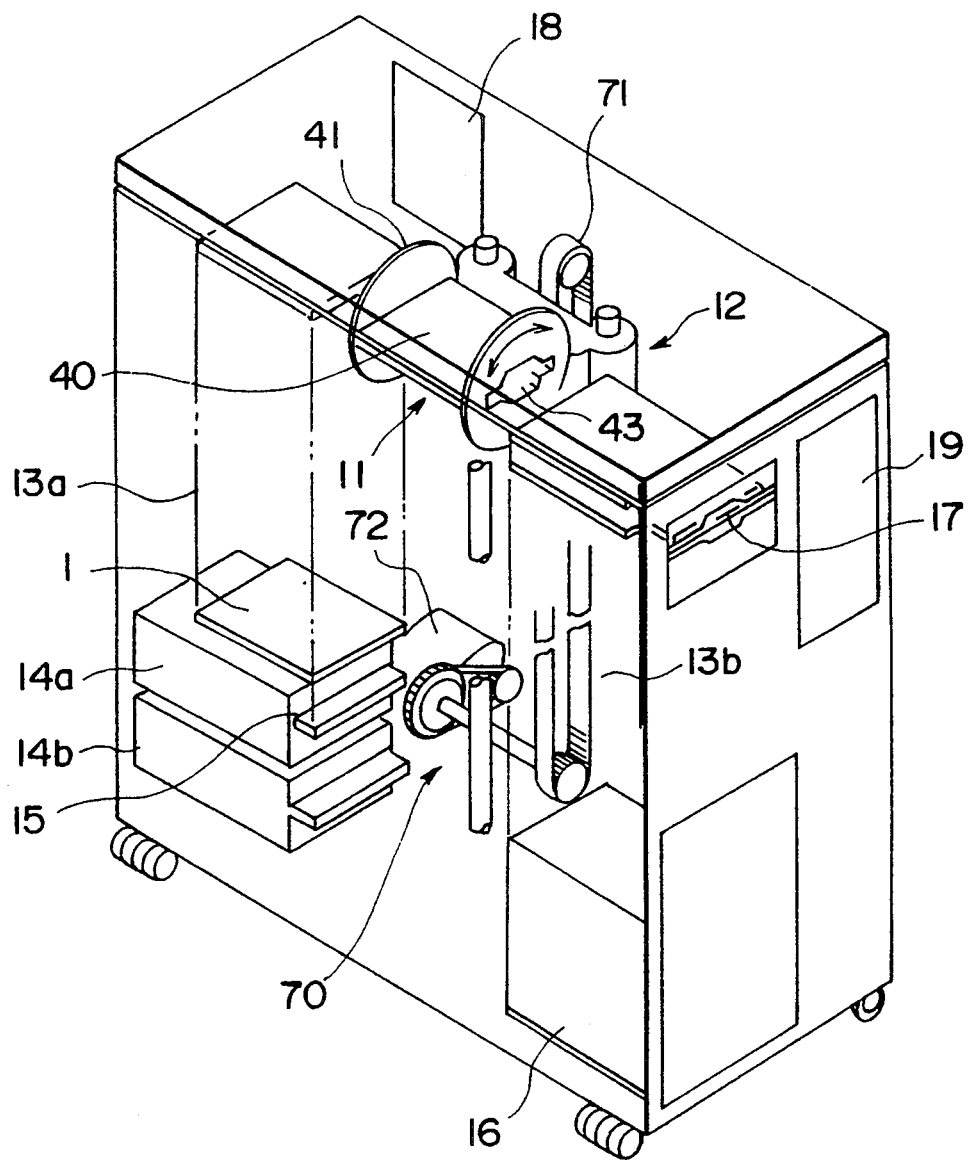
FIG. 1 is a perspective view showing an embodiment of the present invention.

FIG. 1 is a perspective view showing an embodiment of the present invention and it is shown as applied to an automatic disk exchange apparatus by way of example. As shown in the Figure, this automatic disk exchange apparatus includes a disk gripper for gripping a disk cartridge 1 containing an optical disk in a horizontal position, a disk transport device 12 for vertically transporting the disk gripper 11, disk storage devices 13a and 13b arranged at the sides of the disk transport path of the disk gripper 11 and each adapted to horizontally store disk cartridges 1, drive units 14a and 14b arranged in the lower part of the disk storage device 13a and each having a disk inlet/outlet port 15 on the disk transport path side, a moving storage unit 16 arranged in the lower part of the other disk storage device 13b, a disk exchange window 17 for introducing or removing the disk cartridges 1 one at a time, a controller 18 and a display control unit 19.

Figure 2:
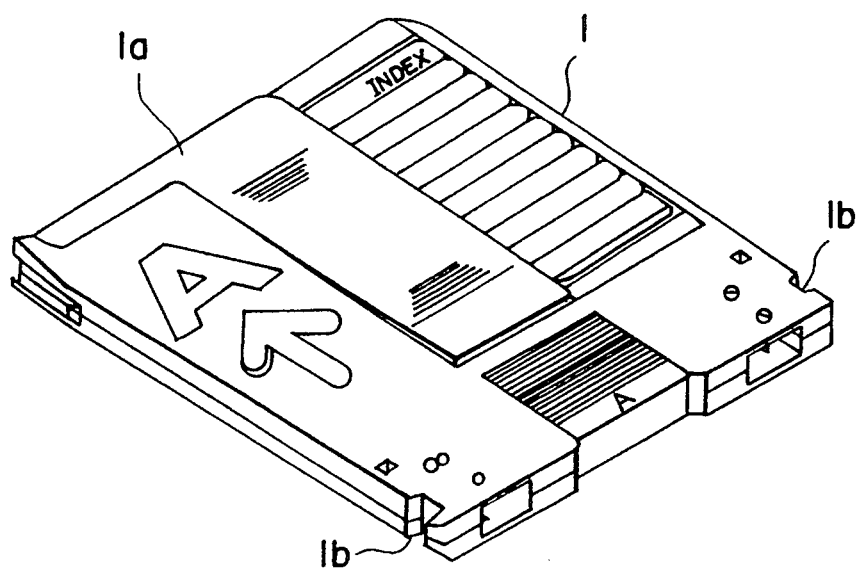
FIG. 2 is a perspective view showing the disk cartridge.

As shown by the perspective view of FIG. 2, the disk cartridge 1 is provided with a slidable shutter 1a on its case surface and notches 1b on the case sides.

Figure 3:
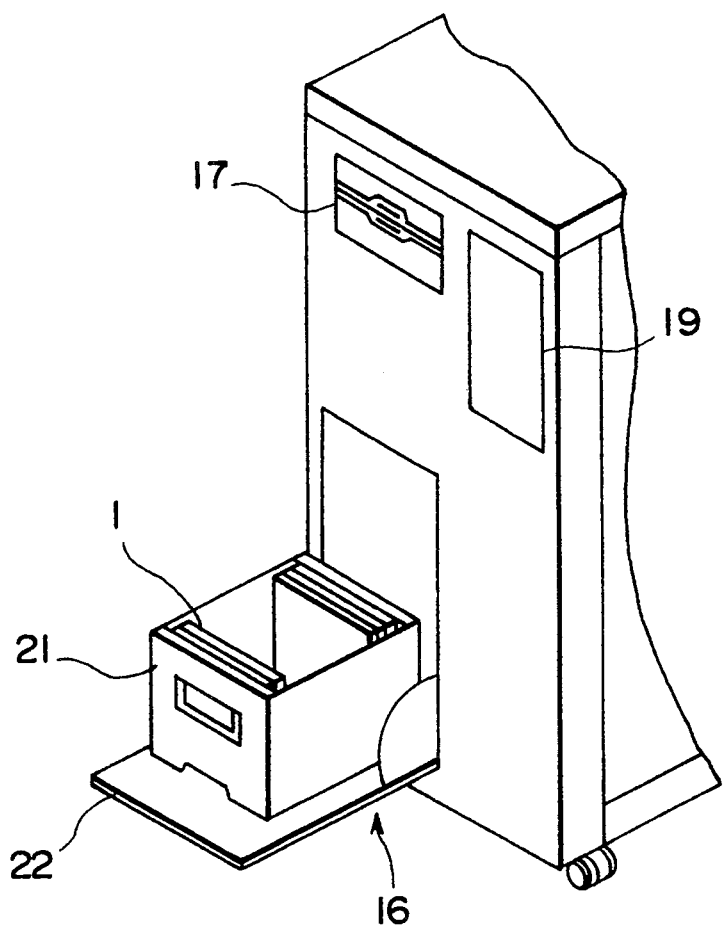
FIG. 3 is a perspective view showing the moving storage unit.
Figure 4:
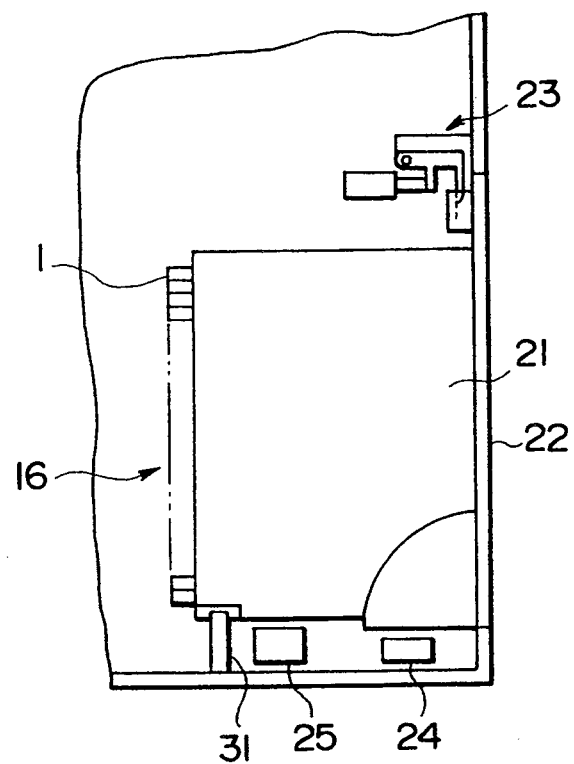
FIG. 4 is a view showing the arrangement of the moving storage unit.

As shown by the perspective view of FIG. 3, the moving storage unit 16 includes a storage pack 21 for storing a given number of, e.g., 16 disk cartridges 1 regularly, and a loading door 22 attached to the front panel of the apparatus, having mounted thereon the surface of the opposite side to the disk cartridge outlet port of the storage panel 21 and pivotable about its lower supporting portion so as to be opened and closed. Then, as shown by the schematic view of FIG. 4, the moving storage unit 16 includes locking means for inhibiting the opening of the loading door 22 during the transfer, recording and reproduction of the disk cartridge 1, a door opening/closing detecting switch 24 operable in response to the opening and closing of loading door 22, and a pack detecting switch 25 for detecting the presence or absence of the storage pack 21 when the loading door 2 is closed.

Figure 5:
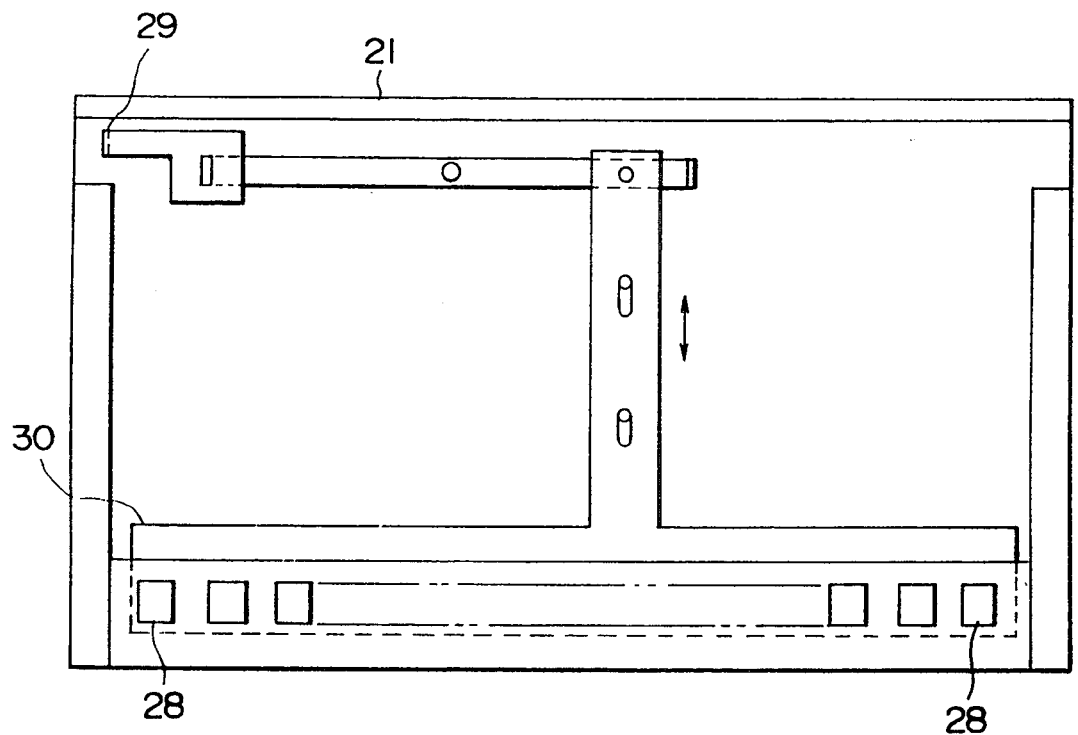
FIG. 5 is a side view showing the storage pack with its side cover taken away.
Figure 6:
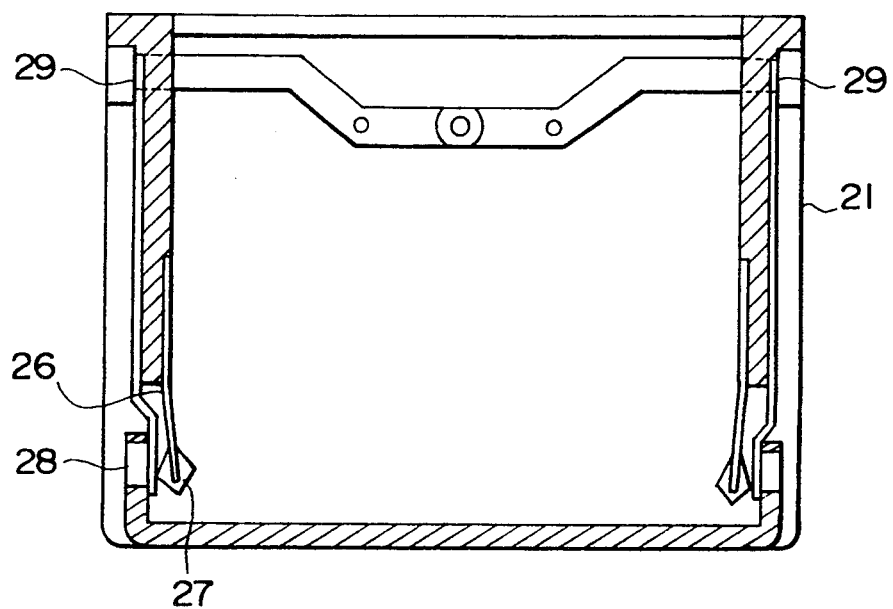
FIG. 6 is a sectional view of the storage pack.

As shown by the side view of FIG. 5 in which the side cover is removed and the sectional view of FIG. 6, the storage pack 21 includes cartridge locking means composed of a plurality of stoppers 27 which are each fastened to a plate spring 26 for engagement with the notch 1b of each disk cartridge 1, a plurality of windows 28 for the escapement of the stoppers 27, a pair of control claws 29 provided at the forward ends of the front face ends of the storage pack 21, and a pair of shielding plates 30 for opening and closing the windows 28 the response to the vertical rotation of the control claws 29. When the loading door 22 is closed, the control claws 29 of the cartridge locking means are pressed against lock release claws 31 of FIG. 4 which are provided on the apparatus proper, thereby moving the shielding plates 30 upward uncovering windows 28 and permitting stoppers 27 to extend into windows 28 thereby releasing the disk.

Figure 7:
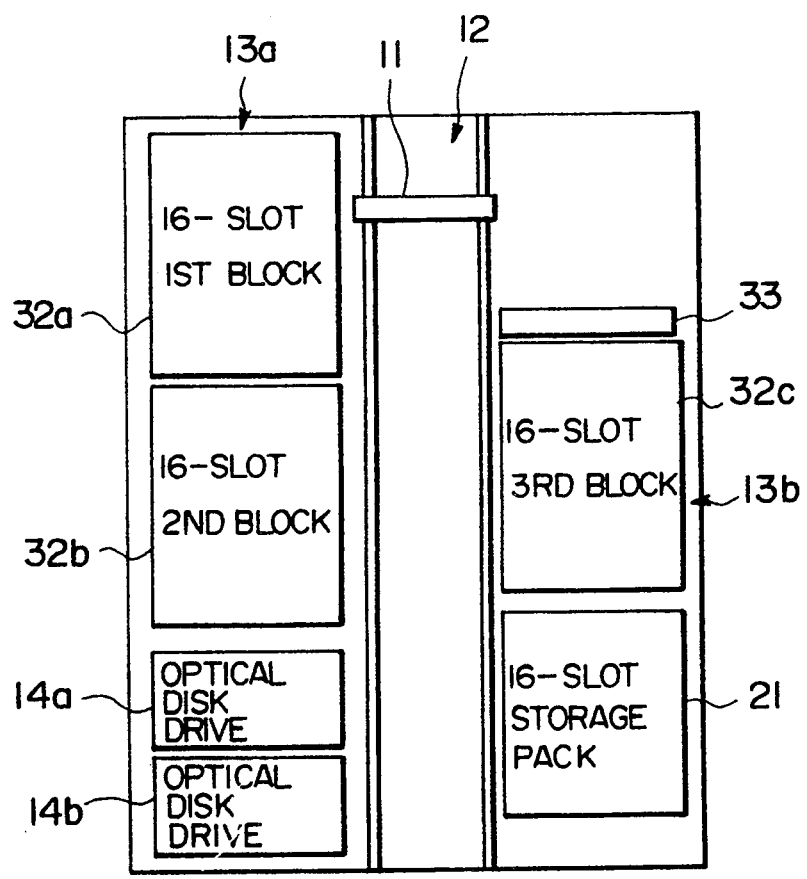
FIG. 7 is a view showing the arrangement of the disk storage devices and the storage pack.

As shown in FIG. 7, the storage pack 21 is divided into a plurality of slots required for storing a given number of, e.g., 16 disk cartridges 1. Also, the disk storage devices 13a and 13b are respectively provided with fixed storage blocks 32a, 32b and 32c each divided into the same number of slots as the storage pack 21 and a temporary stand-by block 33.

Figure 8:
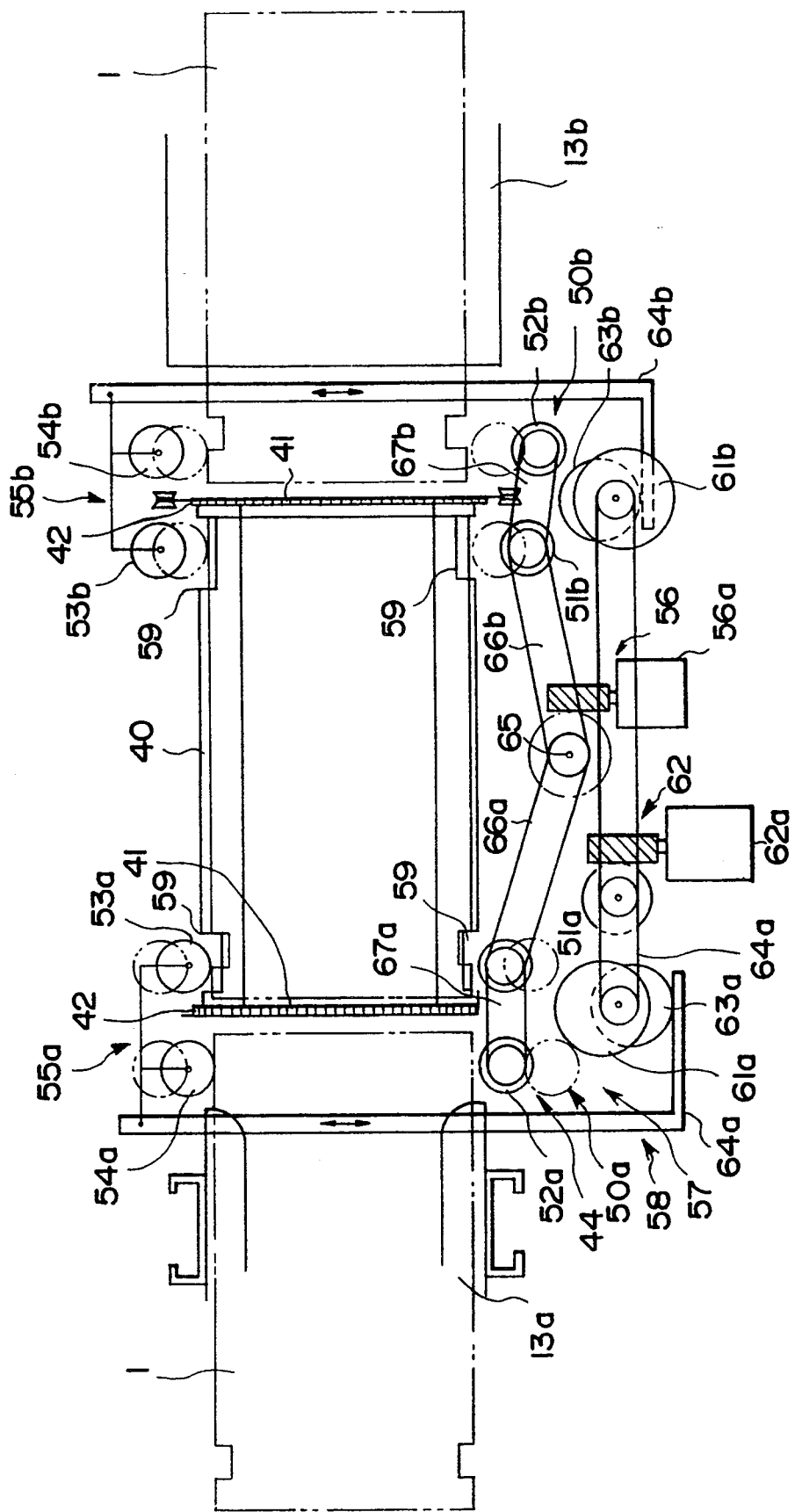
FIG. 8 is a plan view of the disk gripper.
Figure 9:
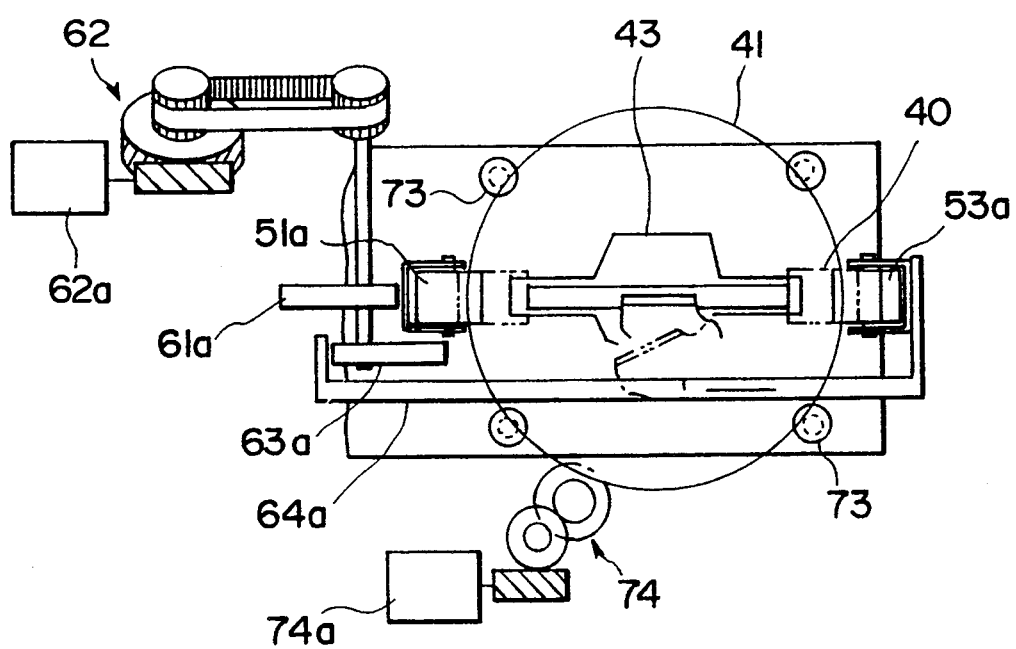
FIG. 9 is a side view of the disk gripper.

As shown by the plan view of FIG. 8 and the side view of FIG. 9, the disk gripper 11 includes a holder 40 for horizontally holding a disk cartridge 1, a pair of rotational drums 41 each attached to one of the ends of the holder 40 and provided with a gear 42 in its outer peripheral surface and a disk access opening 43 in its central portion, and disk exchange means 44 whereby the disk cartridge 1 in the horizontal position is introduced or removed from the holder 40 through either of the disk access openings 43. As shown by the perspective view of FIG. 10, the disk gripper 11 is mounted within a lifting box 45 of lifting means which will be described later and the side plates of the lifting box 45 are each formed with a disk access opening 46 of the same shape as the disk access openings 43 of the rotational drums 41. Also, as shown by the sectional view of FIG. 11, the holder 40 is composed of a pair of rails 40a and 40b consisting of two parallel channel members bridged between the rotational drums 41. Numeral 47 designates a pair of connecting members extended between the rotational drums 41.

With reference to FIG. 8, the disk exchange means 44 includes driving roller pairs 50a and 50b respectively composed of inner gripper rollers 51a and 51b which respectively provided at the ends of one longitudinal side of the holder 40 and adapted to grip the disk cartridge 1 within the holder 40 and outer gripper rollers 52a and 52b respectively arranged externally contiguously to the inner gripper rollers 51a and 51b so as to grip the disk cartridges 1 within the disk storage devices 13a and 13b, respectively, follower roller pairs 55a and 55b composed of inner gripper rollers 53a and 53b and outer gripper Fellers 54a and 54b which are respectively arranged at the ends of the other longitudinal side of the holder 40 in opposition to the driving roller pairs 50a and 50b, gripper roller rotating means 56 for rotating the gripper rollers connected by a driving belt, and driving roller pair changeover means 57 and follower roller pair changeover means 58. Also, the inner gripper rollers 51a, 51b, 53a and 53b are adapted to grip the disk cartridge 1 within the holder 40 through notches 59 formed at the end portions of the holder 40.

The driving roller pair changeover means 57 includes a pair of driving cams 61a and 61b which are respectively engaged with the driving roller pairs 50a and 50b and which are respectively connected with a phase shift of 180 degrees, and rotational driving means 62 for rotating the driving cams 61a and 61b. Also, the driving roller pairs changeover means 57 is provided with a pair of main arms 66a and 66b arranged along the one longitudinal side of the holder 40 and having their base ends adapted to serve as a common rotary shaft 65 and a pair of auxiliary arms 67a and 67b respectively connected to the forward ends of the main arms 66a and 66b. Also, the driving roller pairs 50a and 50b, respectively engaged with the driving cams 61a and 61b with a phase shift of 180 degrees therebetween, are respectively attached to the ends of the auxiliary arms 67a and 67b.

The follower roller pair changeover means 58 includes a pair of cams 63a and 63b which are respectively mounted on the rotary shafts of the driving cams 61a and 61b, of the driving roller pair changeover means 57 with a phase shift of 180 degrees with respect to the driving cams 61a and 61b, respectively, and a pair of links 64a and 64b respectively connected between the cams 63a and 63b and the follower roller pair 55a and 55b.

Figure 10:
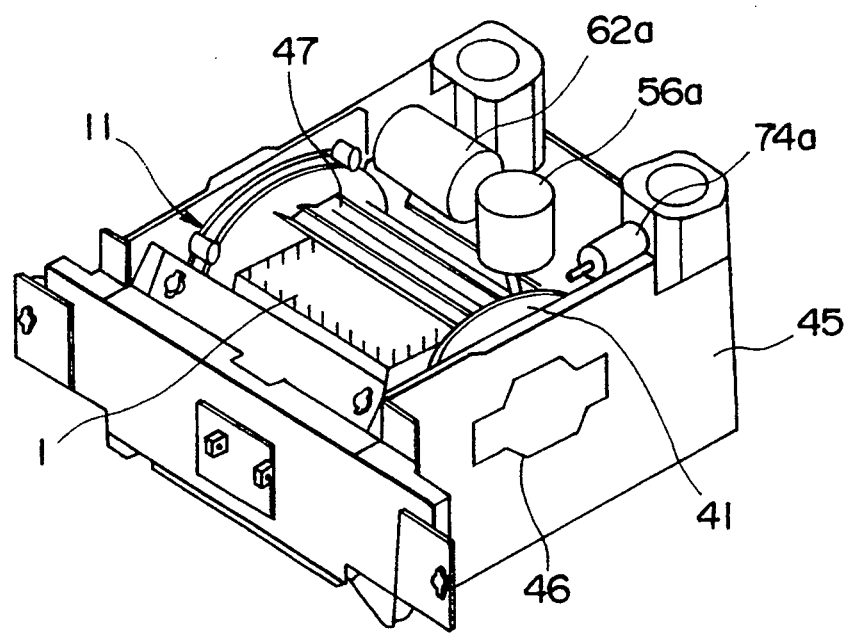
FIG. 10 is a perspective view of the disk gripper.
Figure 11:
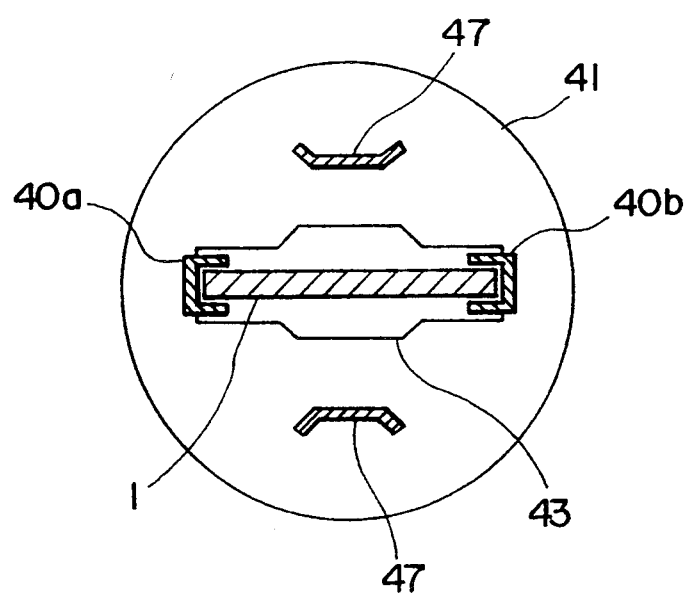
FIG. 11 is a sectional view of the holder of the disk gripper.

With reference to FIG. 1, the disk transport device 12 includes lifting means 70 composed of a lifting mechanism 71 and driving means 72 whereby the disk gripper 11 is supported in the lifting box 45 shown in FIG. 10, moved vertically and stopped at a given position, a plurality of guide rollers 73 shown in FIG. 9, in engagement with the rotational drum 41 of the disk gripper 11 and driving means 74 engaged with the gear 42 in the outer peripheral surface of the rotational drum 41 to rotate the disk gripper 11 about the center of the disk access opening 43 constituting the axis of rotation.

Figure 12:
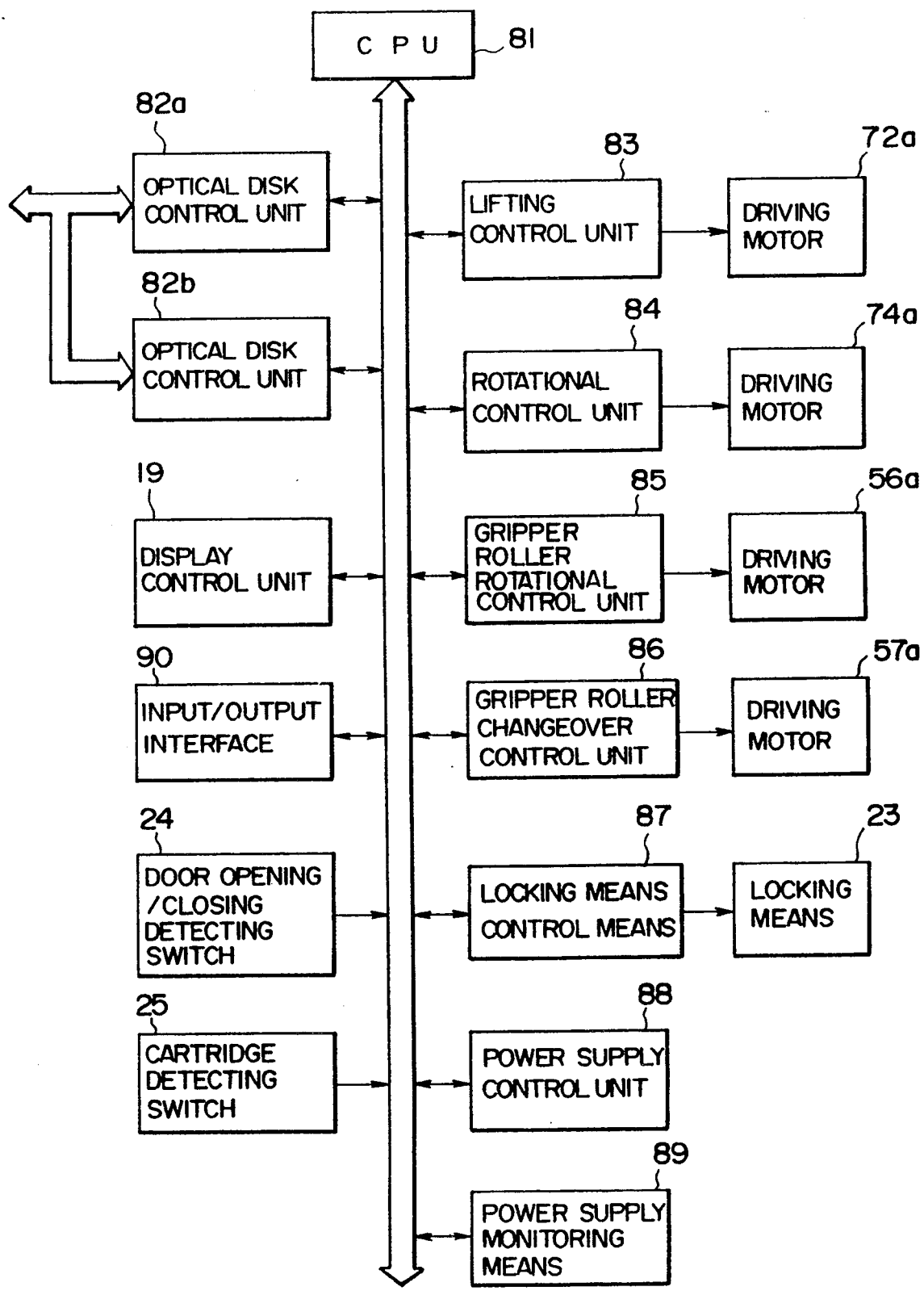
FIG. 12 is a block diagram showing the controller.

FIG. 12 is a block diagram showing the controller 18 of the automatic disk exchange apparatus constructed as described above. As shown in the Figure, the controller 18 includes a CPU 81 for controlling the apparatus on the whole, optical disk control units 82a and 82b for respectively controlling the operation of the drive disks 14a and 14b, a lifting control unit 83 for controlling a drive motor 72a of the lifting means 70, a rotational control unit 84 for controlling a drive motor 74a of the rotational driving means 74, a gripper roller rotational control unit 85 for controlling a drive motor 56a of the gripper roller rotating means 56, a gripper roller changeover control unit 86 for controlling a drive motor 57a of the driving roller pair changeover means 57, a locking means control unit 87 for controlling the operation of the locking means 23, a power supply control unit 88 and power supply monitoring means 89, and the door opening/closing detecting switch 24, time cartridge detecting switch 25 and the display control unit 19 are connected to the controller 18.

The operation of the automatic disk exchange apparatus constructed as described above will be described with reference to cases where the disk cartridges 1 are changed between the disk storage devices 13a and 13b and the drive units 14a and 14b and where the disk cartridges 1 stored in the disk storage devices 13a and 13b are changed between them and the outside, respectively.

(1) In the case of exchanging the disk cartridges 1 between time disk storage devices and the drive units:

When one of the disk cartridges 1 stored in the disk storage devices 13a and 13b is selected, the CPU 81 first brings the lifting control unit 83 into operation so that the lifting means 70 is driven and the disk gripper 11 is moved vertically, thereby stopping the disk gripper 11 at the position where the selected disk cartridge 1 is stored. Then, the CPU 81 brings the gripper roller changeover control unit 86 into operation so that the drive motor 57a of the driving roller pair changeover means 57 is rotated and the driving cams 61a and 61b are rotated, thereby closing the driving roller pair 50a and the follower roller pair 55a which are on the side where the selected disk cartridge 1 is stored and opening the other driving roller pair 50b and follower roller pair 55b. When the driving roller pair 50a and the follower roller pair 55a are closed, the end of the disk cartridge 1 stored in the disk storage device 13a is gripped by the outer gripper rollers 52a and 54a. In this condition, the drive motor 56a of the gripper roller rotating means 56 is rotated by the gripper roller rotation control unit 85 so that the disk cartridge 1 is moved onto the holder 40 by the driving roller pair 50a and the follower roller pair 55a and the disk cartridge 1 is held within the holder 40.

Thereafter, the disk gripper 11 is moved downward to the position of the drive unit 14a by the lifting means 70. Then, the drive motor 56a of the gripper roller rotating means 56 is rotated in the reverse direction and the disk cartridge 1 within the holder 40 is introduced into the drive unit 14a. Then, the driving roller pair 50a and the follower roller pair 55a are opened. Where the disk cartridge 1 is introduced into the drive unit 14a in this way, if it is desired to use the lower side of the optical disk contained in the horizontally transported disk cartridge 1, the CPU 81 brings time rotational control unit 84 into operation so that time drive motor 74a of the rotational driving means 74 is rotated and the disk cartridge 1 is rotated through 180 degrees.

When the disk cartridge 1 is introduced into the drive unit 14a, the optical disk control unit 82a comes into operation and the recording or reproduction of the optical, disk within the disk cartridge 1 is performed. When the recording or reproduction is completed so that the disk cartridge 1 is delivered to the disk inlet/outlet port 15 of the drive unit 14a, the disk cartridge 1 is again held by the disk gripper 11, transported to the position of the disk storage device 13a where it was previously stored and stored thereat.

Where the disk cartridge 1 is transported in the above-mentioned manner, if the selected disk cartridge 1 is stored in the disk storage device 13b on the opposite side to the drive unit 14a, the driving cams 61a and 61b are rotated by the gripper roller changeover means 57a so that the driving roller pair 50b and the follower roller pair 55b on the side of the disk storage device lab are closed and the disk cartridge 1 is gripped, thereby accommodating it in the holder 40. Then, after the disk gripper 11 has been transported to the position of the drive unit 14a, the driving roller pair 50b and the follower roller pair 55b on the side of the disk storage device 13b are opened and the driving roller pair 50a and the follower roller pair 55a on the side of the disk storage device 13a are closed, thereby inserting the disk cartridge 1 within the holder 40 into the drive unit 14a.

Also, in order to return the disk cartridge 1 to the disk storage device 13b form the drive unit 14a, the operation which is entirely reverse to the above-mentioned operation is effected.

(2) In the case of exchanging the disk cartridges 1 between the disk storage devices and the outside:

When, for example, the exchange of the sixteen disk cartridges 1 stored in the first block 32a of the disk storage device 13a is commanded through the input-/output interface 90 of the controller 18, the CPU 81 confirms whether the disk cartridges 1 are being subjected to recording or reproducing operation in the drive units 14a and 14b or being transported by the disk transport device 12 so that when the absence of the recording, reproduction and transportation of the disk cartridges 1 is confirmed, the locking control unit 87 is brought into operation to release the locking of the loading door 22 by the locking means 23 of the moving storage unit 16. When the loading door 22 is opened in response to the release of the locking, the door opening/closing detecting switch 24 comes into operation and a signal resulting from this operation causes the power supply control unit 88 turn off the power supply of the apparatus, with the result that when the loading door 22 is open, the disk transport device 12, etc., are prevented from operating and the operator is prevented from receiving by any chance an electric stock or having his hand caught in the disk transport device 12 when the operator puts his hand into the apparatus.

When the loading door 22 is opened so that the door opening/closing detecting switch 24 comes into operation, if the power supply is not turned off by some reason or other, the power supply monitoring means 89 comes into operation, so that an operation inhibit signal is sent to the CPU 81 at the expiration of a given time period, e.g., 10 seconds. When the operation inhibit single is received, the CPU 81 displays an error on the display control unit 19 and also the operation of the lifting control unit 83, etc., is inhibited. In this way, the safety is ensured doubly when the loading door 22 is opened.

In response to the opening of the loading door 22, the storage pack 21 mounted on the loading door 22 is drawn out with the access opening facing upward. When this occurs, the storage pack 21 is changed with another storage pack 21 containing new disk cartridges 1. At this time, the windows 28 formed in the storage pack 21 are closed by the shielding plates 30 so that the stoppers 27 are not moved and thus the disk cartridges 1 are locked by the stoppers 27. As a result, with the disk cartridges 1 stored therein, the storage pack 21 can be removed and transferred.

After the new storage pack 21 has been mounted on the loading door 22, the loading door 22 is closed so that the locking means 23 comes into operation to lock the loading door 22 and also the door opening/closing detecting switch 24 comes into operation to turn on the power supply of the apparatus by the power supply control unit 88 in response to a signal resulting from operation. When the loading door 22 is closed, the storage pack 21 is loaded at a given position. At this time, whether the storage pack 21 has been loaded is detected by the pack detecting switch 25. Thus, when the storage pack 21 has not been loaded, in response to an absence of storage pack signal from the pack detecting switch 25, the locking means control unit 87 comes into operation so that the locking by the locking means 23 is released and the loading door 22 is partly opened, thereby displaying an error on the display control unit 19.

As a result, it is possible to prevent the disk cartridges 1 from falling off due to the fact that the disk transport device 12 comes into operation in the condition where the storage pack 21 is not loaded.

When the disk cartridges 1 are stored in the storage pack 21, the operation of exchanging the disk cartridges 1 between the storage pack 21 and the disk storage device 13a is started.

Firstly, when the loading door 22 is closed and the storage pack 21 is loaded at a given position, the operating claws 29 of the storage pack 21 are pushed upward by the locking release claws 31 provided on the apparatus proper and the shielding plates 30 are moved, thereby opening the windows 28 of the storage pack 21. As a result, the stoppers 27 are allowed to move into the windows 28 and the locking of the disk cartridges 1 is released.

In this condition, if the administration number of the first block 32a is designated and a command is sent to it from the CPU 81 to exchange the sixteen disk cartridges 1 stored in the first block 32a of the disk storage device 13a for the disk cartridges 1 stored in the storage pack 21, the lifting control unit 83 comes into operation and the disk gripper 11 is moved to the position of the first slot of the storage pack 21 by the lifting means 70. Thus, time disk gripper 11 takes out and holds the unused disk cartridge 1 stored in the first slot of the storage pack 21. Then, the disk gripper 11 is transferred to time position of the temporary stand-by block 33 of the disk storage device 13a so that time unused disk cartridge 1 contained in the disk gripper 11 is stored in the temporary stand-by block 33.

Next, the disk gripper 11 is moved to the position of the first slot in the first block 32a of the disk storage device 13a. Then, the used-up disk cartridge 1 stored in the first block 32a is taken out and held by the disk gripper 11. Then, the disk gripper 11 is moved to time position of the first slot of the storage pack 21 which is vacant as the result of the previous removal and the used-up disk cartridge 1 is stored in this slot.

Thereafter, the disk gripper 11 is transported to the position of the temporary stand-by block 33 so that the disk gripper 11 again holds the unused disk cartridge 1 which is waiting in the temporary stand-by block 33. Then, the disk gripper 11 is moved to the position of the first slot in the first block 32a of the disk storage device 13a and the unused disk cartridge 1 is stored in this slot.

The above-mentioned operation is repeated until all of the disk cartridges 1 stored in the designated first block 32a of the disk storage device 13a are changed.

In this way, the used-up disk cartridges 1 can be automatically exchanged for the unused disk cartridges 1. Also, it is possible to effect the exchange of the used-up disk cartridges 1 for the unused disk cartridges 1 one at a time by utilizing the disk exchange window 17 formed in the apparatus proper.

It is to be noted that while the forgoing exchange operation has been explained with reference to the case where the disk cartridge 1 stored in the disk storage device 13a is first caused to wait in the temporary stand-by block 33 and then the disk cartridge 1 in the storage pack 21 is transported, it is possible to first cause the disk cartridge 1 in the storage pack 21 to stand by temporarily and then transport the disk cartridge 1 stored in the disk storage device 13a.

Since the disk cartridge 1 in the disk storage devices 13a and 13b can be exchanged block by block in this way, not only the control of the disk cartridges 1 during the exchange can be effected easily but also the processing time of the CPU 81 can be reduced.

Also, during the time that the exchange of the disk cartridges 1 is taking place between the disk storage device 13a and the storage pack 21, if recording and reproduction commands are respectively sent to the optical disk control units 82a and 82b, the CPU 81 interrupts the exchange operation for a time and takes out and transports the required disk cartridge 1 to the drive units 14a and 14b by the disk gripper 11, thereby effecting the recording and reproduction. When the recording and reproduction are completed, the CPU 81 resumes time exchange operation.

Figure 13:
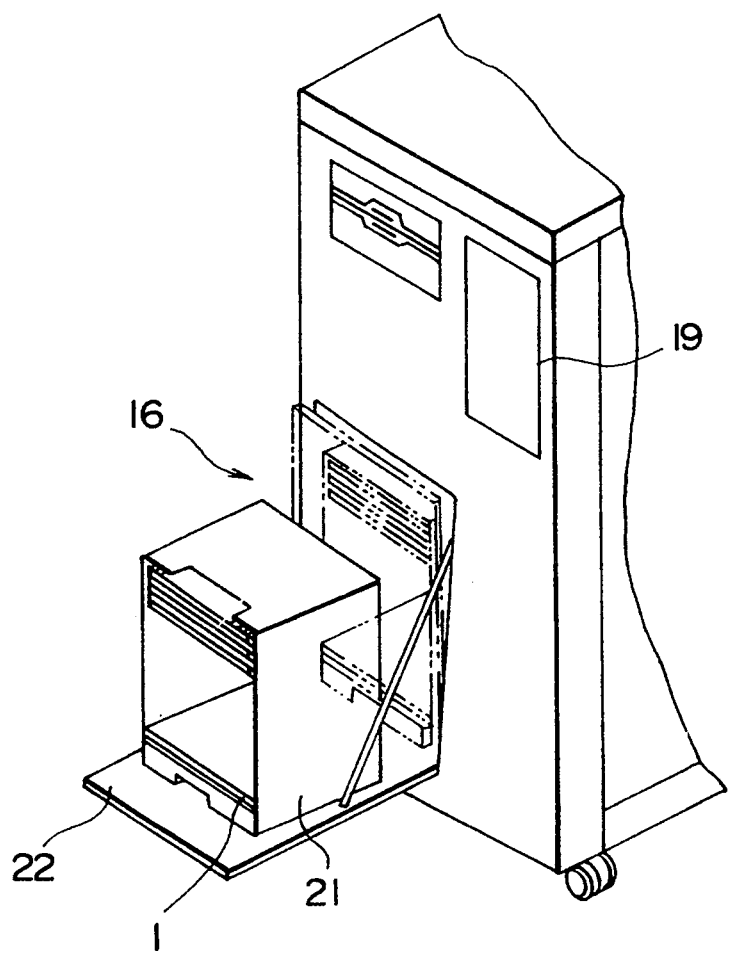
FIG. 13 is a perspective view showing the moving storage unit of another embodiment.
Figure 14:
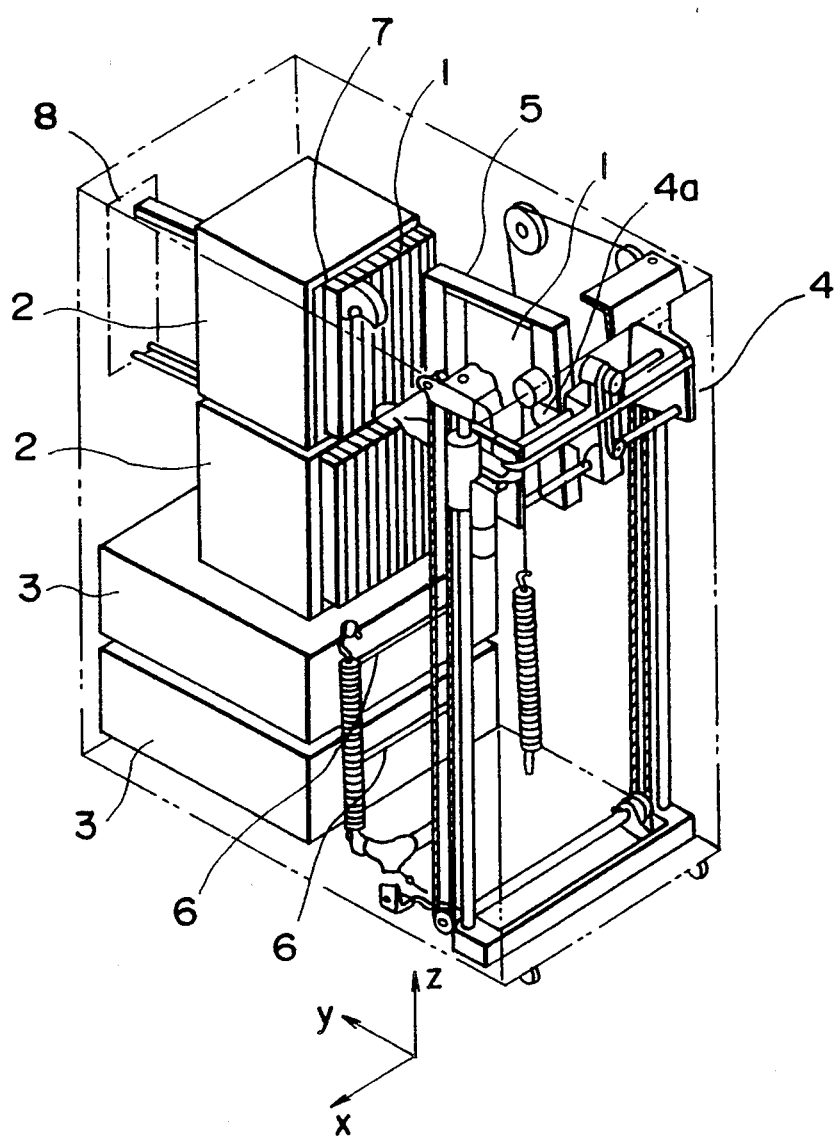
FIG. 14 is a perspective view showing a conventional apparatus.

It is to be noted that while the above-described embodiment has been described with reference to the case where time storage pack 21 is mounted on the loading door 22 so that the storage pack 21 is unloaded and loaded by the opening and closing of the loading door 22, the storage pack 21 may be loaded and unloaded as a single unit as shown in FIG. 13. In this case, the loading door 22 is also opened by its downward rotation so that when the storage pack 21 is to be loaded or unloaded, the storage pack 21 can be placed on the loading door 22 and therefore time loading and unloading of the storage pack 21 can be effected easily.

We claim:
1. A disk storage apparatus comprising:
   a disk gripper including a holder for horizontally holding a disk cartridge and disk exchange means for selectively introducing onto and removing a disk cartridge from said holder;
   a disk transport device including means for vertically moving said disk gripper to stop at a given position;
   at least one disk storage device arranged on at least one side of a transport path of said disk gripper and adapted for horizontally storing a plurality of disk cartridges;
   a moving storage unit loaded in a lower part of at least one said disk storage device and including a storage pack for horizontally storing a predetermined number of disk cartridges;
   a loading door for said moving storage unit formed in an outer wall of a loading portion of said storage apparatus;
   locking means for inhibiting opening of said loading door during the transfer of a disk cartridge or the recording or reproduction of a disk;

a door opening/closing detecting switch for sending a power supply turn-off signal in response to the opening of said loading door and a power supply turn-on signal in response to the closing of said loading door; and a power supply monitoring means for sending an operation inhibiting signal when the power supply is not turned off before the expiration of a predetermined time after the reception of a power supply turn-off signal from said door opening/closing detecting switch upon the opening of said loading door.

2. A disk storage apparatus as set forth in claim 1 further comprising a pack detecting switch responsive to the closing of said loading door to detect whether said storage pack has been loaded when said loading door is closed and thereby to send a locking release signal for said locking means when said storage pack is not loaded.

3. A disk storage apparatus as set forth in claim 2, wherein said loading door of said moving storage unit is formed in a front panel of said disk storage apparatus.

4. A disk storage apparatus as set forth in claim 1, wherein said storage pack of said moving storage unit includes cartridge locking means for locking the disk cartridges in said storage pack when said storage pack is removed from said storage apparatus and releasing said locking means when said storage pack is loaded into said storage apparatus.

5. A disk storage apparatus as set forth in claim 1, wherein in addition to the loading of said moving storage unit in the lower part of one of said disk storage devices, a plurality of drive units for recording and reproducing information from a disk are arranged in a lower part of another of said disk storage devices.

6. In a disk storage apparatus including means for selectively recording and reproducing information from a disk, the improvement comprising a moving storage unit for loading into said disk storage device through a loading door in an outer wall of said storage apparatus a storage pack for storing a predetermined number of disk cartridges;

locking means for inhibiting opening of said loading door during the transfer of a disk cartridge and the recording and reproduction of a disk;

a door opening/closing detecting switch for sending a power supply turn-off signal in response to the opening of said loading door and a power supply turn-on signal in response to the closing of said loading door; and a power supply monitoring means for sending an operation inhibiting signal when the power supply is not turned off before the expiration of a predetermined time after the reception of said power supply turn-off signal from said door opening/closing detecting switch upon the opening of said loading door.

7. A disk storage apparatus as set forth in claim 6 further comprising a pack detecting switch responsive to the closing of said loading door to detect whether said storage pack has been loaded when said loading door is closed and thereby to send a locking release signal for said locking means when said storage pack is not loaded.

8. A disk storage apparatus as set forth in claim 6, wherein said storage pack of said moving storage unit includes cartridge locking means for locking the disk cartridges in said storage pack when said storage pack is removed from said disk storage apparatus and releasing said locking means when said storage pack is loaded into said storage apparatus.

9. A disk storage apparatus as set forth in claim 6, wherein said loading door of said moving storage unit is formed in a front panel of said disk storage apparatus.

* * * * *